United States Patent [19]
Pruett et al.

[11] Patent Number: 4,837,845
[45] Date of Patent: Jun. 6, 1989

[54] METHOD FOR ROTATING A BINARY IMAGE

[75] Inventors: David R. Pruett, Saugerties; Gerald Goertzel, White Plains; Gerhard R. Tompson, Wappingers Falls, all of N.Y.

[73] Assignee: International Business Machines Corporation, Armonk, N.Y.

[21] Appl. No.: 150,466

[22] Filed: Feb. 2, 1988

Related U.S. Application Data

[63] Continuation of Ser. No. 793,611, Oct. 31, 1985, abandoned.

[51] Int. Cl.$^4$ ............................................. G06K 9/32
[52] U.S. Cl. .................................... 382/46; 340/727
[58] Field of Search .................. 382/46, 44; 340/727; 364/731

[56] References Cited

U.S. PATENT DOCUMENTS

| | | | |
|---|---|---|---|
| 3,976,982 | 8/1976 | Eiselon | 382/46 |
| 4,052,699 | 10/1977 | Mick et al. | 382/46 |
| 4,271,476 | 6/1981 | Lotspiech | 382/46 |
| 4,467,448 | 8/1984 | Regehr et al. | 364/900 |
| 4,545,069 | 10/1985 | Kermisch | 382/46 |
| 4,627,020 | 12/1986 | Anderson et al. | 382/46 |
| 4,636,783 | 7/1987 | Omachi | 382/46 |
| 4,689,824 | 8/1987 | Mitchell et al. | 382/46 |

OTHER PUBLICATIONS

Morrin, "Rotation of Images Using Contour Compressed Data", *IBM Tech. Disc. Bulletin,* vol. 18, No. 8, Jan. 1976, pp. 2640-2642.

Casey et al., "Parallel Linear Transformations on Two-Dimensional Binary Images", *IBM Tech. Disc. Bulletin,* vol. 13, No. 11, Apr. 1971, pp. 3267-3268.

Benson et al., "On Line Data Base Level Control", *IBM Tech. Disc. Bulletin,* vol. 18, No. 8, Jan. 1976, p. 2663.

Eklundh, "A Fast Computer Method for Matrix Transposing," *IEEE Transactions on Computers,* Jul. 1972, pp. 801-803.

*Primary Examiner*—Leo H. Boudreau
*Assistant Examiner*—Joseph Mancuso
*Attorney, Agent, or Firm*—Robert L. Troike; Frederick D. Poag; George E. Clark

[57] ABSTRACT

The present invention deals with rotating an n×n block of bits through an angle of +90 degrees or −90 degrees by a method including the steps of: storing the data in a matrix; separating the matrix into groups of bits of rotatable size; transposing first preselected bit positions with second preselected bit positions in each group; and exchanging a first one or more rows of bits in the group with a second one or more rows of bits in the group.

4 Claims, 6 Drawing Sheets

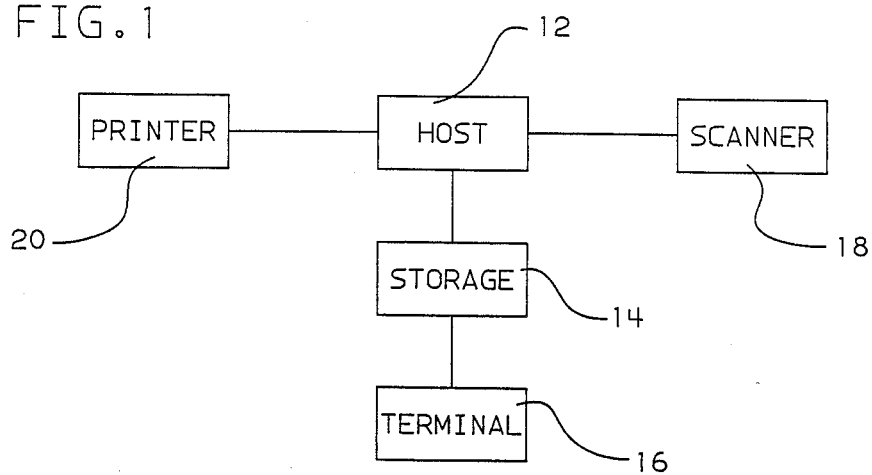
FIG.1
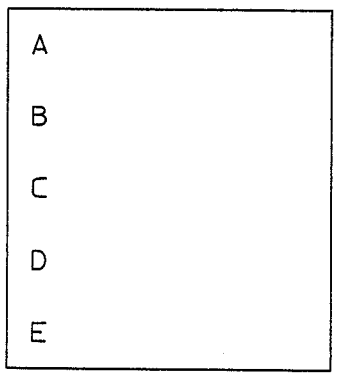
FIG.2.1
ORIGINAL IMAGE
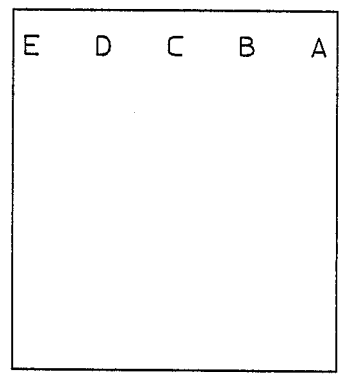
FIG.2.2
90 DEGREE CW ROTATION
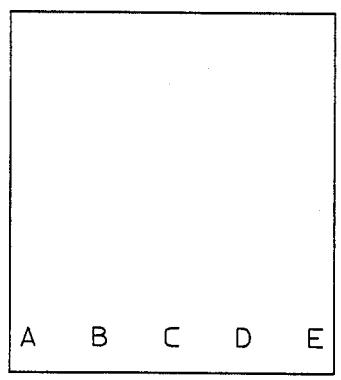
FIG.2.3
90 DEGREE CCW ROTATION FIG.3.1
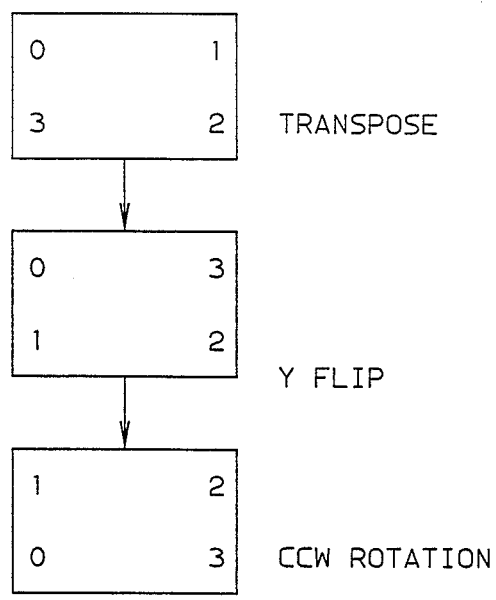
FIG.3.2
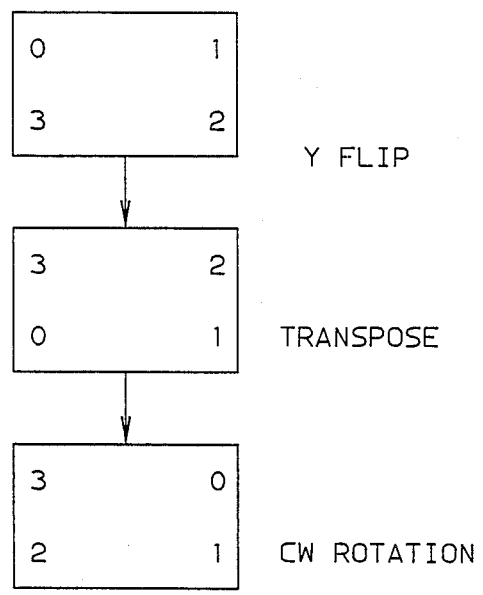

FIG. 4

ROW EXCHANGE METHOD a. EXCHANGE ROWS 1 AND 8

```
L   R1,ROW 1    GET CONTENTS OF FIRST ROW INTO R1
L   R2,ROW 8    GET CONTENTS OF 8TH ROW INTO R2
ST  R2,ROW 1    PUT FORMER CONTENTS OF 8TH ROW INTO FIRST
ST  R1,ROW 8    PUT FORMER CONTENTS OF FIRST ROW INTO 8TH
``` b. EXCHANGE ROWS 2 & 7 IN A SIMILAR FASHION TO STEP A
c. EXCHANGE ROWS 3 & 6 IN A SIMILAR FASHION TO STEP A
d. EXCHANGE ROWS 4 & 5 IN A SIMILAR FASHION TO STEP A

FIG. 6

 REGISTER 1

XXXX        XXXX      GROUPS TO SWAP

 REGISTER 2

FIG.5.1  ORIGINAL 8 X 8
BIT BLOCK

| | | | | | | | |
|---|---|---|---|---|---|---|---|
| 11 | 12 | 13 | 14 | 15 | 16 | 17 | 18 |
| 21 | 22 | 23 | 24 | 25 | 26 | 27 | 28 |
| 31 | 32 | 33 | 34 | 35 | 36 | 37 | 38 |
| 41 | 42 | 43 | 44 | 45 | 46 | 47 | 48 |
| 51 | 52 | 53 | 54 | 55 | 56 | 57 | 58 |
| 61 | 62 | 63 | 64 | 65 | 66 | 67 | 68 |
| 71 | 72 | 73 | 74 | 75 | 76 | 77 | 78 |
| 81 | 82 | 83 | 84 | 85 | 86 | 87 | 88 |

FIG.5.2  CCW ROTATED 8 X 8
BIT BLOCK

| | | | | | | | |
|---|---|---|---|---|---|---|---|
| 18 | 28 | 38 | 48 | 58 | 68 | 78 | 88 |
| 17 | 27 | 37 | 47 | 57 | 67 | 77 | 87 |
| 16 | 26 | 36 | 46 | 56 | 66 | 76 | 86 |
| 15 | 25 | 35 | 45 | 55 | 65 | 75 | 85 |
| 14 | 24 | 34 | 44 | 54 | 64 | 74 | 84 |
| 13 | 23 | 33 | 43 | 53 | 63 | 73 | 83 |
| 12 | 22 | 32 | 42 | 52 | 62 | 72 | 82 |
| 11 | 21 | 31 | 41 | 51 | 61 | 71 | 81 |

FIG.5.3  CW ROTATED 8 X 8
BIT BLOCK

| | | | | | | | |
|---|---|---|---|---|---|---|---|
| 81 | 71 | 61 | 51 | 41 | 31 | 21 | 11 |
| 82 | 72 | 62 | 52 | 42 | 32 | 22 | 12 |
| 83 | 73 | 63 | 53 | 43 | 33 | 23 | 13 |
| 84 | 74 | 64 | 54 | 44 | 34 | 24 | 14 |
| 85 | 75 | 65 | 55 | 45 | 35 | 25 | 15 |
| 86 | 76 | 66 | 56 | 46 | 36 | 26 | 16 |
| 87 | 77 | 67 | 57 | 47 | 37 | 27 | 17 |
| 88 | 78 | 68 | 58 | 48 | 38 | 28 | 18 |

FIG. 7

| ORIGINAL | |
|---|---|
| ABCDEFGH | B11(BYTE) |
| ------ | B21 |
| ------ | B31 |
| ------ | B41 |
| ------ | B51 |
| ------ | B61 |
| ------ | B71 |
| QRSTUVWX | B81 |

| OUTPUT | |
|---|---|
| A-----Q | T11(BYTE) |
| B-----R | T21 |
| C-----S | T31 |
| D-----T | T41 |
| E-----U | T51 |
| F-----V | T61 |
| G-----W | T71 |
| H-----X | T81 |

FIG. 8.1

| ABCDEFGH | | | | | | | QRSTUVWX |
|---|---|---|---|---|---|---|---|
| B11 | B21 | B31 | B41 | B51 | B61 | B71 | B81 |

FIG. 8.2

| A----Q | C----S | E----U | G----W | B----R | D----T | F----V | H----X |
|---|---|---|---|---|---|---|---|
| T11 | T31 | T51 | T71 | T21 | T41 | T61 | T81 |

FIG. 8.3

| A----Q | B----R | C----S | D----T | E----U | F----V | G----W | H----X |
|---|---|---|---|---|---|---|---|
| T11 | T21 | T31 | T41 | T51 | T61 | T71 | T81 |

FIG. 9

```
        INPUT         OUTPUT

LINE 0  WXYZ@#$%      C840...W
     1  ....****      D951...X
     2  ....****      EA62...Y     DESIRED ROTATION
     3  ....****      FB73...Z     OF AN 8 X 8 BIT
     4  0123KLMN ===> '''K***@     BIT MATRIX
     5  4567''''      '''L***#
     6  89AB''''      '''M***$
     7  CDEF''''      '''N***%
```

```
STEP  REG       BITS OF REGISTER                       EXPLANATION
----  ---       ----------------                       -----------
 IN   R1   CDEF''''89AB''''4567''''0123KLMN       LOAD L7,L6,L5,L4
      R2   @#$%....****....****....****WXYZ       LOAD L3,L2,L1,L0 &
           ----    ----    ----    ----                    ROR 4
  1   R1   CDEF....89AB....4567....0123WXYZ       SWAP ALT GRPS OF 4
      R2   @#$%''''****''''****''''****KLMN       (BITS UNDER DASHES)

1R   R1   CDEF....89AB....4567....0123WXYZ       NO CHANGE
      R2   ''''****KLMN@#$%''''****''''****       ROTATE RIGHT 12
                   ----------------
  2   R1   CDEF....89AB....''''****''''****       SWAP LOWER HLVS
      R2   ''''****KLMN@#$%4567....0123WXYZ       (BITS UNDER DASHES)

2R   R1   CDEF....89AB....''''****''''****       NO CHANGE
      R2   $%4567....0123WXYZ''''****KLMN@#       ROTATE LEFT 14
           --  --  --  --  --  --  --  --
  3   R1   CD45....8901..WX''''****''KL**@#       SWAP ALT GRPS OF 2
      R2   $%EF67....AB23..YZ''''****''MN**       (BITS UNDER DASHES)

3R   R1   CD45....8901..WX''''****''KL**@#       NO CHANGE
      R2   ''MN**$%EF67....AB23..YZ''''****       ROTATE RIGHT 6
                 --------        --------
  4   R1   CD45....EF67....''''****''''****       SWAP ALT GRPS OF 8
      R2   ''MN**$%8901..WXAB23..YZ''KL**@#       (BITS UNDER DASHES)

4R   R1   CD45....EF67....''''****''''****       NO CHANGE
      R2   %8901..WXAB23..YZ''KL**@#''MN**$       ROTATE LEFT 7
           - - - - - - - - - - - - - - - -
  5   R1   C840...WEA62...Y'''K***@'''M***$       SWAP ALTERNATE BITS
      R2   %D951...XFB73...Z'''L***#'''N***       (BITS UNDER DASHES)

5R   R1   C840...WEA62...Y'''K***@'''M***$       NO CHANGE
      R2   D951...XFB73...Z'''L***#'''N***%       ROTATE LEFT 1
```

METHOD FOR ROTATING A BINARY IMAGE

This is a continuation of application Ser. No. 793,611 filed Oct. 31, 1985, now abandoned.

BACKGROUND OF THE INVENTION

1. Field of the Invention

The present invention relates to digital image processing methods and more particularly to improved methods for image rotation.

2. Description of the Prior Art

The following are systems representative of the prior art.

U.S. Pat. No. 4,627,020 teaches a method for rotating image data which recognizes and takes advantage of the fact that large areas of most images are background color such as white and that digital representations of the pels in these background areas need not be rotated since an all zeros 8×8 bit block of pels is the same in any 90 degree rotation of the block. However, the patent does not teach nor suggest the simplified method for rotation of n X n bit blocks including transposing bits within the block and flipping the block according to the present invention.

U.S. Pat. No. 3,976,982 shows a method of rotation of an image by 90 degree among other functions performed. However, the patent does not show a method for rotating an image by 90 degrees which includes rotation of n X n bit blocks including transposing bits within the block and flipping the block.

U.S. Pat. No. 3,968,475 shows a digital processor for extracting data from a binary image in which the image is divided into an array of sample areas each sample area containing an array of binary data spaces. Although the patent demonstrates image rotation by any one of a number of predetermined angles, the patent does not show a method for rotating an image by 90 degrees either clockwise or counterclockwise including rotation of n X n bit blocks including transposing bits within the block and flipping the block.

U.S. Pat. No. 4,052,699 relates to an image processing system wherein video data is stored in a matrix having n rows and n columns. The image is rotated 90 degrees in a piece-meal fashion by vertically accessing word by word video data previously stored as horizontal words. However, the method and apparatus of the patent do not include rotation of n X n bit blocks including transposing bits within the block and flipping the block.

U.S. Pat. No. 4,168,488 shows hardware for image rotation of a word organized image buffer where the buffer is divided into a number of square sections each storing a portion of the full image. Although the patent shows apparatus for image rotation through an angle of 90 degrees, the patent does not show a method which includes rotation of n X n bit blocks including transposing bits within the block and flipping the block.

U.S. Pat. No. 4,225,929 relates to a code converter including means for rotating an image about a center point. The patent does not include rotation of n X n bit blocks including transposing bits within the block and flipping the block.

U.S. Pat. No. 4,271,476 relates to apparatus for rotating horizontal scan format images into vertical scan format images for printing or other processing. The patented apparatus divides the image into a number of sections and then rotates each section in sequence. The patent does not show a method including rotation of n X n bit blocks including transposing bits within the block and flipping the block.

U.S. Pat. No. 4,467,448 relates to an image rotation control circuit for controlling printing of an image on a printer. The published control circuit does not store the entire display but merely a single line at a time which is converted from a horizontal line to a vertical line or vice versa for printing. The publication does not show a method for rotating an image by 90 degrees including rotation of n X n bit blocks including transposing bits within the block and flipping the block.

An article in the IBM Technical Disclosure Bulletin, Vol. 18, No. 8, January 1976, p. 2640 shows a method for rotation of images using contour compressed data. However, the article does not include rotation of n X n bit blocks including transposing bits within the block and flipping the block.

An article in the IBM Technical Disclosure Bulletin, Vol. 13, No. 11, April 1971, p. 3267 shows a method for performing a fast transformation of axes on two dimensional binary images. The article does not include rotation of n X n bit blocks including transposing bits within the block and flipping the block.

An article in the IBM Technical Disclosure Bulletin, Vol. 18, No. 8, January 1976 at page 2633 shows a shift register system for image orientation which among other functions rotates an image in 4×4 array of characters. The articles does not include rotation of n X n bit blocks including transposing bits within the block and flipping the block.

A letter by J.O. Eklundh entitled "A Fast Computer Method for Matrix Transposing." in the IEEE Transactions on Computers, July 1972 at Page 801, presents a method for transporting n X n data matrices having some similarity to the transposition algorithm used with the method of the present invention. However, the article does not show a method for rotation of n X n bit blocks including transposing bits within the block and flipping the block.

The prior art discussed above does not teach nor suggest the present invention as disclosed and claimed herein.

SUMMARY OF THE INVENTION

Therefore, it is an object of the present invention to rotate binary data, by 90 degrees by a method including the steps of: storing the data in a matrix; separating the matrix into groups of bits of rotatable size; transposing first preselected bit positions with second preselected bit positions in each group; and exchanging a first one or more rows of bits in the group with a second one or more rows of bits in the group.

It is another object of the present invention to rotate binary data by 90 degrees as above by a method further including the step of simultaneously transposing a number of blocks of bits simultaneously.

It is yet another object of the present invention to rotate binary data by 90 degrees as above further including the step of offsetting one of a pair of registers from the other of the pair of registers by a preselected number of bits and exchanging the preselected number of bits between the two registers so that a first preselected number of bits of the first register are intact and the last preselected number of bits of the second register are left intact.

Accordingly, the method according to the present invention rotates an n by n block of bits through an angle of plus or minus 90 degrees including the steps of storing the data in a matrix, separating the matrix into groups of bits of rotatable size, transposing first preselected bit positions with second preselected bit positions in each group, and exchanging a first one or more rows of bits in the group with a second one or more rows of bits in the group.

The foregoing and other objects, features and advantages of the invention will be apparent from the more particular description of the preferred embodiments of the invention, as illustrated in the accompanying drawings.

BRIEF DESCRIPTION OF THE DRAWING

FIG. 1 is a block diagram of a system configuration capable of executing the method of the present invention.

FIG. 2.1 is a diagram of a vertical stripe of n X n bit blocks displayed before rotation.

FIG. 2.2 is a diagram of the stripe of blocks shown in FIG. 2.1 displayed after ninety degree clockwise rotation.

FIG. 2.3 is a diagram of the stripe of blocks shown in FIG. 2.1 displayed after ninety degree counterclockwise rotation.

FIG. 3.1 is a schematic diagram of the method of the present invention as applied to a 2×2 bit block of data for a ninety degree counterclockwise rotation.

FIG. 3.2 is a schematic diagram of the method of the present invention as applied to a 2×2 bit block of data for a ninety degree clockwise rotation.

FIG. 4 is a row exchange method in accordance with the present invention.

FIG. 5.1 is a table showing the position of each bit in an 8×8 bit block of data before rotation.

FIG. 5.2 is a table showing the position of each bit in an 8×8 bit block of data after counterclockwise rotation by ninety degrees.

FIG. 5.3 is a table showing the position of each bit in an 8×8 bit block of data after clockwise rotation by ninety degrees.

FIG. 6 is a schematic diagram of register alignment for an alternate m bit swap in accordance with an alternate embodiment of the present invention.

FIG. 7 is a diagram of block bit configuration before and after a transpose in accordance with the present invention.

FIG. 8.1 is a schematic diagram of input register contents before a transpose in accordance with an alternate embodiment of the present invention.

FIG. 8.2 is a schematic diagram of register contents after a NEAR TRANSPOSE in accordance with an alternate embodiment of the present invention.

FIG. 8.3 is a schematic diagram of register contents after a FULL TRANSPOSE in accordance with an alternate embodiment of the present invention.

FIG. 9 is a diagram of register contents for each step of the method according to an alternate embodiment of the present invention.

In the drawing, like elements are designated with similar reference numbers, and identical elements in different specific embodiments are designated by identical reference numbers.

DESCRIPTION OF PREFERRED EMBODIMENTS OF THE INVENTION

Image processing systems such as is shown in FIG. 1, are generally designed to perform a variety of data manipulations on image data such as rotation by 90, 180, or 270 degrees, and expansion or reduction of image size to meet the requirements of display devices or printers or resolution changes.

The present invention, which relates to rotation of data in blocks of predetermined size by 90 degrees either clockwise or counter-clockwise may be executed in a system which includes a host processor 12 an image storage 14, a display terminal 16, an image scanner 18 and a printer 20. The display terminal 16, the image scanner 18 and the printer 20 each may have different requirements for reading or presentation of a document or image. Accordingly, the host processor 12 in conjunction with image store 14 will be required to manipulate the image data to meet the presentation requirements of each of the peripheral devices 16, 18, and 20. The method according to the present invention may be executed by the system shown in FIG. 1.

The rotation of an image can be broken down to a rotation of square blocks around an image, (see FIG. 2.1, 2.2, 2,3), and then rotation of the blocks within themselves. As shown in FIG. 2.1, 2.2 and 2.3, one way to break down the rotation process is to convert an 8 pel wide vertical stripe to an 8 pel high horizontal band, and to repeat this operation. The vertical stripe is composed of stacked 8×8 pel blocks, A, B, C, D, and E, while the horizontal band consists of those same blocks side by side. For clockwise rotation the bottom block, E, in the stripe becomes the leftmost block in the band, while for counterclockwise rotation, the bottom block, E, in the stripe becomes the bottom right corner block in the band. Thus the key to generalized rotation for an average process is being able to rotate the 8 by 8 blocks, as the rest of the process is byte oriented.

Another method for completing the 90 degree rotation of a bitmap containing transposed 8×8 blocks is described in 'Method for Rotating a Binary Image', U.S. Pat. No. 4,627,020.

The present invention relates to a method for rotating an 8×8 block of bits through an angle of +90 degrees of −90 degrees. The problem is clearly one of mapping eight bytes of data into another eight bytes. The rotation problem can be reduced to two parts: rearranging the bytes, and obtaining the transpose of an 8×8 block of bits (See FIG. 3.1 and 3.2). The embodiments of the present invention demonstrate efficient means for achieving this objective.

THE METHOD OF THE PRESENT INVENTION

Rotation can be viewed as a combination of a transposition and a mirror image flip as shown in FIG. 3.1 for counterclockwise (CCW) rotation and in FIG. 3.2 for clockwise (CW) rotation. Since X flips would generally involve looking up each byte of the block in a flip table, the method of the present invention employs Y-flips, which can be accomplished by row exchanges. FIG. 4 shows the necessary steps to accomplish row exchanges. As can be seen in step a of FIG. 4, the exchanges are accomplished by loading two or more rows into registers and then storing each row back at a specific address, different than the one from which it came. Because the transpose manipulations to be shown proceed most efficiently when one or more 8×8 bit blocks have been loaded into registers for manipulation, and because this also requires that the block(s) be returned to storage once transposed, it is a simple matter to implement the row exchanges during this loading and storing by storing each row at a different address than the one it was loaded from, similar to the method shown in FIG. 4. The addresses are not arbitrary, but must proceed as follows:

If R1 is designated as the register containing the top row for the transpose operation, then loading R1 with row 8 and storing the top transposed row into row 1 effects a Y-flip BEFORE the transpose. Loading R1 from row 1 and storing R1 (after the transpose) into ROW 8 effects a Y-flip AFTER the transpose.

Therefore, a sufficient solution to handling both directions of rotation is an efficient transposer. This also handles any requirement to tranpose the image. Transposing can be useful for certain mathematical operations such as finding the determinant or inverse of a bit matrix.

An original 8×8 bit block is shown in Table I below:

TABLE I

| 11 | 12 | 13 | 14 | 15 | 16 | 17 | 18 | (byte 1) |
| 21 | 22 | 23 | 24 | 25 | 26 | 27 | 28 | (byte 2) |
| 31 | 32 | 33 | 34 | 35 | 36 | 37 | 38 | (byte 3) |
| 41 | 42 | 43 | 44 | 45 | 46 | 47 | 48 | (byte 4) |
| 51 | 52 | 53 | 54 | 55 | 56 | 57 | 58 | (byte 5) |
| 61 | 62 | 63 | 64 | 65 | 66 | 67 | 68 | (byte 6) |
| 71 | 72 | 73 | 74 | 75 | 76 | 77 | 78 | (byte 7) |
| 81 | 82 | 83 | 84 | 85 | 86 | 87 | 88 | (byte 8) |

The transposed block is shown in Table II as:

TABLE II

| 11 | 21 | 31 | 41 | 51 | 61 | 71 | 81 | (byte 1) |
| 12 | 22 | 32 | 42 | 52 | 62 | 72 | 82 | (byte 2) |
| 13 | 23 | 33 | 43 | 53 | 63 | 73 | 83 | (byte 3) |
| 14 | 24 | 34 | 44 | 54 | 64 | 74 | 84 | (byte 4) |
| 15 | 25 | 35 | 45 | 55 | 65 | 75 | 85 | (byte 5) |
| 16 | 26 | 36 | 46 | 56 | 66 | 76 | 86 | (byte 6) |
| 17 | 27 | 37 | 47 | 57 | 67 | 77 | 87 | (byte 7) |
| 18 | 28 | 38 | 48 | 58 | 68 | 78 | 88 | (byte 8) |

It is well known that the transpose of a square matrix whose linear dimension is the p'th power of two can be obtained in p steps. The matrix of Table I is thought of as being subdivided into 4 square sub-matrices of equal size. The upper right and lower left sub-matrices are interchanged. For example this yields

TABLE III

| 11 | 12 | 13 | 14 | 51 | 52 | 53 | 54 |
| 21 | 22 | 23 | 24 | 61 | 62 | 63 | 64 |
| 31 | 32 | 33 | 34 | 71 | 72 | 73 | 74 |
| 41 | 42 | 43 | 44 | 81 | 82 | 83 | 84 |
| 15 | 16 | 17 | 18 | 55 | 56 | 57 | 58 |
| 25 | 26 | 27 | 28 | 65 | 66 | 67 | 68 |
| 35 | 36 | 37 | 38 | 75 | 76 | 77 | 78 |
| 45 | 46 | 47 | 48 | 85 | 86 | 87 | 88 |

Each sub-matrix is considered as being further divided into four parts, each part being square. The upper right and lower left part are interchanged in each of the sub-matrices. For example

TABLE IV

| 11 | 12 | 31 | 32 | 51 | 52 | 71 | 72 |
| 21 | 22 | 41 | 42 | 61 | 62 | 81 | 82 |
| 13 | 14 | 33 | 34 | 53 | 54 | 73 | 74 |
| 23 | 24 | 43 | 44 | 63 | 64 | 83 | 84 |
| 15 | 16 | 35 | 36 | 55 | 56 | 75 | 76 |
| 25 | 26 | 45 | 46 | 65 | 66 | 85 | 86 |
| 17 | 18 | 37 | 38 | 57 | 58 | 77 | 78 |
| 27 | 28 | 47 | 48 | 67 | 68 | 87 | 88 |

This process of division and interchange is continued until 1×1 matrices are interchanged. In this embodiment, one further step yields the transposed matrix; the off diagonal elements in each of the sixteen 2×2 blocks are interchanged.

Two embodiments of the present invention are described, one using 8 registers containing 32 bits of storage each to do 4 blocks simultaneously, the second using 2 registers containing 32 bits each to do only one block. The invention can also be implemented with a larger number of smaller registers, such as 16 bit registers or 8 bit registers. The alternate (2 register) embodiment requires two additional rearrangement steps beyond the 3 interchanges shown. Additionally, the 4 block (preferred) embodiment permits either the loading of the blocks into the registers or the storing of the blocks after completion of the block reorganization to be done on a 32 bit basis rather than on an 8 bit basis, assuming the bit mapped storage is mapped in horizontal scan order.

OPERATION

Preferred Embodiment

A preferred embodiment of a method of block transposition according to the present invention will be described.

To transpose four 8×8 matrices in parallel, the matrices are arranged as follows:

TABLE V

| b11 | b12 | b13 | b14 | (R1) |
| b21 | b22 | b23 | b24 | (R2) |
| b31 | b32 | b33 | b34 | (R3) |
| b41 | b42 | b43 | b44 | (R4) |
| b51 | b52 | b53 | b54 | (R5) |
| b61 | b62 | b63 | b64 | (R6) |
| b71 | b72 | b73 | b74 | (R7) |
| b81 | b82 | b83 | b84 | (R8) |

Where R1–R8 are general purpose 32-bit registers. The bytes b11–b81 contain the first 8×8 matrix to be transposed, the bytes b12–b82 the second, etc. A SWAP macro is used to implement the interchanges shown in Tables I, II, and III. The SWAP macro exchanges selected bits between a pair of registers as is shown in FIG. 6. The macro SWAP a,b,m,mask includes the following IBM System 370 instructions:

| LR | x,b | Load Register |
| SRL | x,m | Shift Right Logical |
| XR | x,a | Exclusive Or Register |
| N | x,mask | And |
| XR | a,x | Exclusive Or Register |
| SLL | x,m | Shift Left Logical |
| XR | b,x | Exclusive Or Register |

The four matrices are transposed in place by the following 12 SWAP's :

```
SWAP R1,R5,4,X'0F0F0F0F'
SWAP R2,R6,4,X'0F0F0F0F'
SWAP R3,R7,4,X'0F0F0F0F'
SWAP R4,R8,4,X'0F0F0F0F'
SWAP R1,R3,2,X'33333333'
SWAP R2,R4,2,X'33333333'
SWAP R5,R7,2,X'33333333'
SWAP R6,R8,2,X'33333333'
SWAP R1,R2,1,X'55555555'
SWAP R3,R4,1,X'55555555'
SWAP R5,R6,1,X'55555555'
SWAP R7,R8,1,X'55555555'
```

Note that this is three swaps per 8×8 bit transpose.

There are certain devices which require a different bit order after transposition. For such devices, the following extension to the method of the present invention applies.

After transposing four 8×8 blocks in parallel, the byte map is as follows:

TABLE VI

| t11 | t12 | t13 | t14 | (R1) |
|-----|-----|-----|-----|------|
| t21 | t22 | t23 | t24 | (R2) |
| t31 | t32 | t33 | t34 | (R3) |
| t41 | t42 | t43 | t44 | (R4) |
| t51 | t52 | t53 | t54 | (R5) |
| t61 | t62 | t63 | t64 | (R6) |
| t71 | t72 | t73 | t74 | (R7) |
| t81 | t82 | t83 | t84 | (R8) | where t11-t81 are the bytes contained in the first transposed block, t12-t82 are the bytes contained in the second, etc.

The required order of bytes for these devices is:

TABLE VII

| t11 | t21 | t31 | t41 | (R1) |
|-----|-----|-----|-----|------|
| t51 | t61 | t71 | t81 | (R2) |
| t12 | t22 | t32 | t42 | (R3) |
| t52 | t62 | t72 | t82 | (R4) |
| t13 | t23 | t33 | t43 | (R5) |
| t53 | t63 | t73 | t83 | (R6) |
| t14 | t24 | t34 | t44 | (R7) |
| t54 | t64 | t74 | t84 | (R8) |

This arrangement of bytes can be achieved by performing two additional sets of swap operations on the transposed blocks.

```
SWAP R1,R3,16,X'0000FFFF'
SWAP R2,R4,16,X'0000FFFF'
SWAP R5,R7,16,X'0000FFFF'
SWAP R6,R8,16,X'0000FFFF'
``` giving the result

TABLE VIII

| t11 | t12 | t31 | t32 | (R1) |
|-----|-----|-----|-----|------|
| t21 | t22 | t41 | t42 | (R2) |
| t13 | t14 | t33 | t34 | (R3) |
| t23 | t24 | t43 | t44 | (R4) |
| t51 | t52 | t71 | t72 | (R5) |
| t61 | t62 | t81 | t82 | (R6) |
| t53 | t54 | t73 | t74 | (R7) |
| t63 | t64 | t83 | t84 | (R8) | and

```
SWAP R1,R2,8,X'00ff00ff'
SWAP R3,R4,8,X'00FF00FF'
SWAP R5,R6,8,X'00FF00FF'
SWAP R7,R8,8,X'00FF00FF'
``` giving the result

TABLE IX

| t11 | t21 | t31 | t41 | (R1) |
|-----|-----|-----|-----|------|
| t12 | t22 | t32 | t42 | (R2) |
| t13 | t23 | t33 | t43 | (R3) |
| t14 | t24 | t34 | t44 | (R4) |
| t51 | t61 | t71 | t81 | (R5) |
| t52 | t62 | t72 | t82 | (R6) |
| t53 | t63 | t73 | t83 | (R7) |
| t54 | t64 | t74 | t84 | (R8) |

This is the desired result except that the registers are not in the proper order for a multiple register store operation. Since the embodiment described thus far would work equally well with any register assignment, the initial loading of data can be changed from sequential registers to loading of data into registers in this order: R1, R3, R5, R7, R2, R4, R6, R8. Corresponding changes must also be made in the register names of the SWAP statements. With these changes, the final ordering of registers will be sequential and a fast multiple register store operation can be used to save the result.

ALTERNATE EMBODIMENT

An alternate embodiment of a transposition technique in accordance with the present invention will now be described.

ALTERNATE m BIT TRANSPOSE SUB-COMPONENT

Referring now to FIG. 6, a second embodiment of the transpose method of the present invention will be described. Two registers are offset from each other by m bits. This may be done by a rotate right of m bits on register 2 for most microprocessors. At this point alternate groups of m bits are exchanged between the two registers, so that the first m bits of register one are intact and the last m bits of register 2 are left intact. The second group of m bits of register 1 are swapped with the first group of m bits of register 2. Then the initial shift is undone to straighten the registers.

EXAMPLE

An ALTSWAP macro as illustrated below may provide more efficient operation than the SWAP macro, described above with reference to the preferred embodiment of the present invention, for some microprocessors.

A utility register, named RU, is used.
1. Rotate Register 2 Right m bits.
2. load RU with reg 1. (or reg containing right part)
3. RU = RU exclusive OR'd with R2
4. RU = RU AND MASK (containing 1's in swap positions)
5. R1 = R1 exclusive OR'd with RU
6. R2 = R2 exclusive OR'd with RU
7. Rotate Register 2 Left m bits. groups are now swapped.

NEAR TRANSPOSE OPERATION

If an 8×8 block of pixels as shown as ORIGINAL in FIG. 7, it is to be transposed to the configuration shown as OUTPUT in FIG. 7, the ORIGINAL block is stored in a pair of Registers as shown in FIG. 8.1.

The NEAR TRANSPOSE is defined as the result shown in FIG. 8.2.

The FULL TRANSPOSE is defined as the result stored in the pair of registers as shown in FIG. 8.3.

The NEAR TRANSPOSE result can be stored (byte by byte) with no more effort than the FULL TRANSPOSE, except the order of byte storing is slightly different. Since the vertically adjacent bytes of both input and output blocks occur in separate horizontal image scans, they are not adjacent in storage. They appear in storage separated by the width of the horizontal scans. For this reason either result is stored byte by byte and there is no particular advantage to having a full transpose vs. a near transpose.

IMPLEMENTATION:
1. ALTSWAP 4
2. ALTSWAP 16
3. ALTSWAP 2
4. ALTSWAP 8

5. ALTSWAP 1
    Near Transpose Complete
6. ALTSWAP 8
7. ALTSWAP 16
    Full Transpose Complete Although the ALTSWAP m OPERATION was defined as beginning and ending with shift/rotate operations in the amount of m bits, it is clear that when two consecutive ALTSWAP operations occur, the ending shift of the first ALTSWAP may be combined with the beginning shift of the second ALTSWAP to produce a single shift operation. As an example, Step 3 above would end in ROTATE LEFT 2 while step 4 would being with ROTATE RIGHT 8. These two are concatenated to produce a single ROTATE RIGHT 6 operation. The total number of operations for a NEAR TRANSPOSE is 31 using this method of concatenation.

Generalizing the NEAR TRANSPOSE result:
For any N×N block, where N=2**P,

```
L1: DO for I=1 to (P-1);
      ALTSWAP (2**(P-I));
      ALTSWAP (2**(2*P-1-I));
    END L1;(or NEXT I, or whatever)
    ALTSWAP 1;
```

EXAMPLE CLOCKWISE ROTATION

FIG. 9 shows a step by step execution of the rotation algorithm on an 8 pel by 8 pel block. The pels have been partially numbered, or rather partially assigned symbols so that their progress may be tracked. The lower left quadrant of the input block is completely numbered while the upper edge of the other three are numbered. The remaining pels are assigned symbols that identify their quadrant.

Thus, while the invention has been described with reference to preferred embodiments thereof, it will be understood by those skilled in the art that various changes in form and details may be made without departing from the scope of the invention.

What is claimed is:

1. A method for rotating binary data by 90 degrees, comprising the steps of: storage said data in a matrix arranged in r rows by c columns, where r may be equal to c, information in each row being stored in a number of bytes, each byte having b bits, there being c/b bytes in each said row;

separating said matrix into groups of bits of rotatable size;

arranging the groups of bits into registers so that those bits to be exchanged line up in corresponding bit positions of different registers and all the bits to be exchanged can be exchanged in parallel;

simultaneously exchanging selected group positions between registers to thereby simultaneously transpose first selected bit positions with second selected bit positions in said each group under the control of a mask instruction;

storing said simultaneously transposed groups of bits into predetermined registers; and repeating said steps of arranging, exchanging and storing until said matrix has been rotated by 90 degrees.

2. A method for rotating binary data by 90 degrees according to claim 1, wherein the step of exchanging selected group positions between registers includes the step of:

performing a swap under mask function on selected bits in first and second registers of a plurality of registers storing said matrix, wherein said mask controls the selection of bits.

3. A method for rotating binary data by 90 degrees according to claim 1 wherein said steps of arranging and simultaneously exchanging selected group positions between registers is performed by:

executing an alternate swap instruction including the additional steps of:

rotating a first preselected register right m bits;

loading a utility register with the contents of a second preselected register;

exclusive ORing said utility register with said first preselected register;

performing a mask operation on said utility register;

repeating said exclusive ORing on said utility register with said first and second preselected registers; and rotating said first preselected register left m bits to complete the alternate swap operation.

4. A method for rotating binary data by 90 degrees according to claim 1, wherein said step of arranging the groups of bits includes storing selected bits of one of said groups of bits of rotatable size in a pair of registers and offsetting a second of said registers from a first of said registers by a predetermined number of bits; and the step of exchanging includes the step of exchanging alternate groups of bits equal in number to the number of bits of the offset between the two registers.

* * * * *